United States Patent [19]

Wolkenstein

[11] Patent Number: 4,536,289

[45] Date of Patent: Aug. 20, 1985

[54] FILTER PRESS FOR DEWATERING OF MATERIALS

[75] Inventor: Robert Wolkenstein, Liezen, Austria

[73] Assignee: Voest-Alpine Aktiengesellschaft, Vienna, Austria

[21] Appl. No.: 542,607

[22] Filed: Oct. 17, 1983

[30] Foreign Application Priority Data

Oct. 18, 1982 [AT] Austria ............................... 3829/82

[51] Int. Cl.³ .............................................. B01D 33/04
[52] U.S. Cl. .................................... 210/401; 198/813; 474/136
[58] Field of Search ................................ 100/118–120, 100/151–154; 162/273; 210/297, 400, 401, DIG. 3, 160; 198/584, 813; 474/101, 136

[56] References Cited

U.S. PATENT DOCUMENTS

| | | | |
|---|---|---|---|
| 3,506,128 | 4/1970 | Pashaian et al. | 210/400 |
| 4,062,780 | 12/1977 | Eastabrook | 210/401 |
| 4,066,548 | 1/1978 | Olson et al. | 210/160 |
| 4,142,971 | 3/1979 | LeFur et al. | 210/400 X |

FOREIGN PATENT DOCUMENTS 156687  1/1921  United Kingdom ............... 474/101

*Primary Examiner*—Richard V. Fisher
*Assistant Examiner*—W. Gary Jones
*Attorney, Agent, or Firm*—Cushman, Darby & Cushman

[57] ABSTRACT

The filter press for dewatering of materials such as, for example, sewage sludges has two sieve belts or filter belts (18, 19) being passed, with inclusion therebetween of the material to be dewatered, in common over dewatering drums (2, 3, 4, 5, 6). Behind the dumping location for the dewatered cake, the sieve belts or filter belts (18, 19) are separately returned again and tensioning rolls for adjusting the belt tension of the sieve belts or filter belts (18, 19) are provided at this area. The tensioning rolls (27, 32) are adjusted by a common actuating member (34) acting on the axes of the tension rolls (27, 32), so that an uniform belt tension is obtained for both sieve belts or filter belts. (FIG. 1)

6 Claims, 3 Drawing Figures

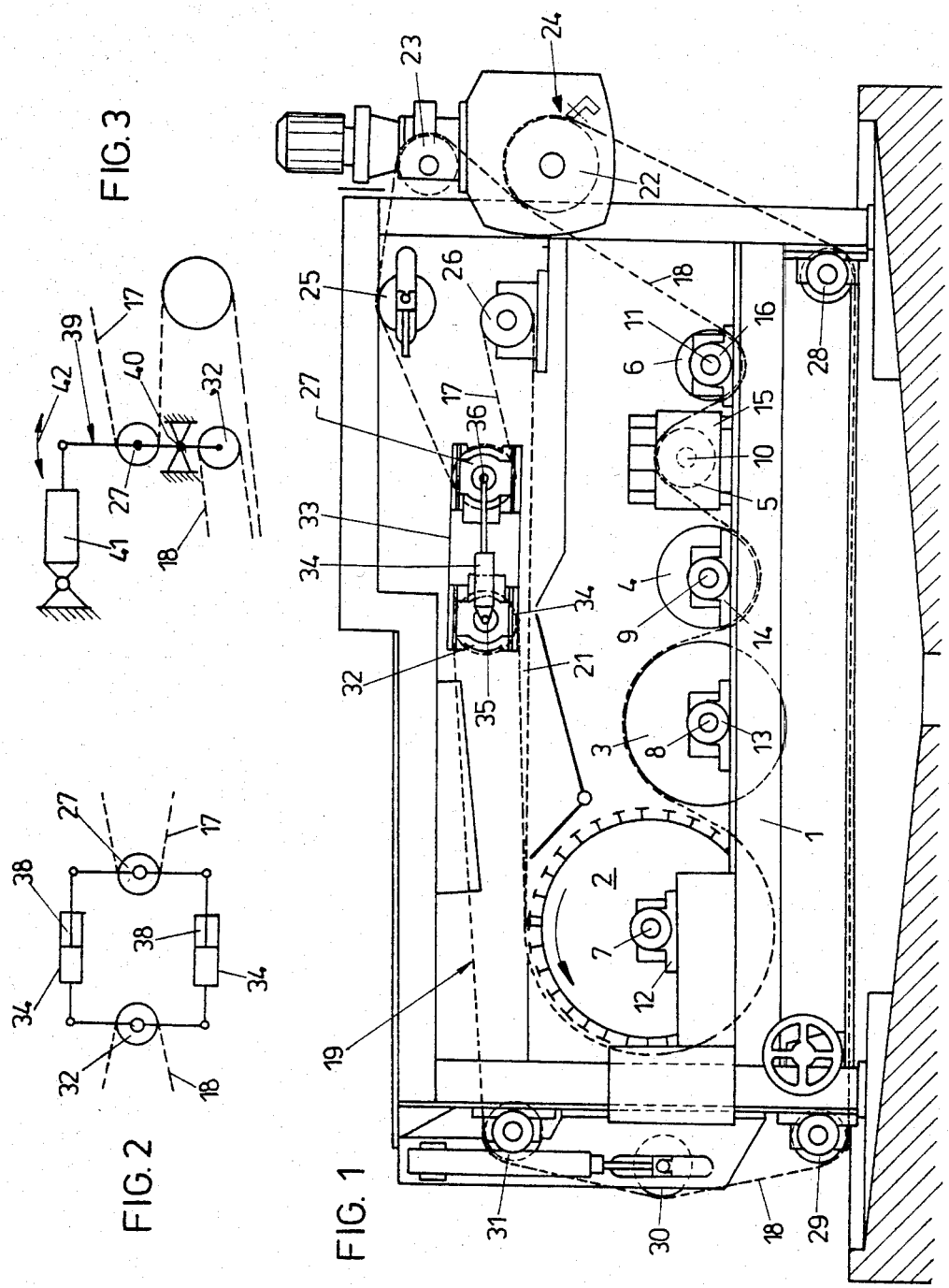

FILTER PRESS FOR DEWATERING OF MATERIALS

The invention refers to a filter press for dewatering of materials, in which the material to be dewatered is passed between two water-permeable sieve belts or filter belts over dewatering drums and is subjected to pressure by the tension of the water-permeable belts, the material to be dewatered being supplied onto one of said both water-permeable belts, the dewatered material being dumped at a location located behind the dewatering drums as seen in direction of movement of the belts and said both water-permeable belts being separately guided between the dumping location and the supply area. Known filter presses of this type suffer from the drawback that during operation the tension of the water-permeable belts is varying in dependence on the thickness of the layer of the material to be dewatered and on its consistency. If the thickness of the layer of the material to be dewatered becomes smaller during operation, the tension of the belt is reduced. This results in a reduction of the pressure exerted on the material to be dewatered and in a reduction of the dewatering effect. Any change of the consistency of the material to be dewatered is of influence on the tension of the belt, because with a higher consistency of the material to be dewatered the thickness of the layer of the material to be dewatered is changed for a smaller amount within the dewatering zone than when the material to be dewatered is supplied with a higher water content. Any adjustment of the tension of the water-permeable belts within the range between the supply area and the dumping location - in which range the belts are separately guided - has, with older constructions, separately been effected for each belt, thereby primarily taking into consideration a difference in any elongation of said both sieve belts. With these known constructions it was impossible to give both belts the same belt tension without expensive control equipment. Most frequently, both separately guided belts were passed around deflection rolls having their axes adjustable by means of manually operable worm drives, thereby, however, only considering the differing length of both sieve belts but not applying a well-defined belt tension.

Now, it is an object of the invention to provide a filter press of the initially mentioned type, in which both sieve belts can be maintained in a particularly simple manner in a tensioned condition and in which the same tension force can be applied for both sieve belts. For solving this task, the invention essentially consists in that the sieve belts are separately passed over a tensioning roll being adjustable in transverse direction to its axis, the adjusting movement of said tensioning roll being effected by an actuating member common for both tensioning rolls and acting on the axes of the tensioning rolls. In view of a common actuating member being provided for the tensioning rolls being provided each for one sieve belt, there is, beside an automatic compensation of differing lengths of the sieve belts, achieved that substantially the same tensioning force is acting on both sieve belts. Such an uniform belt tension results in a substantial reduction of wear of the belts and the belt tension can be controlled by controlling only one actuating member. Adjusting operation for the belt tension is thus substantially facilitated.

According to the invention, the arrangement can be such that the bearings of the tensioning rolls for the separately returning sieve belts are arranged for being guided, preferably between parallel guide means, in direction of the adjusting movement and that at least one actuating member such as, for example, a hydraulic cylinder-piston-aggregate, an electric servo motor of the linear drive type or the like is acting on the bearings. However, also two or more actuating members can be connected one with the other.

The tensioning rolls can be arranged one above another or one beside the other. A particularly simple construction results if the bearings of both tensioning rolls are mutually connected via a two-armed lever being pivotally supported between both axes of the tensioning rolls and if at least one actuating member is acting on one arm of the lever. With such a construction, both belts are adjusted via the same way. In an advantageous manner, the pivotal point of the lever is arranged for being shiftable within a guide means in parallel relation to the direction of action of the tensioning force, so that there exists the possibility for the sieve belts to establish an equilibrium between the tensioning forces. Any compensation to give both belts equal length results in making more uniform the belt stress and with uniform load on the belts the adjusting force required for adjusting both loads can result in a well suitable approximated value for the tensioning force acting on both belts.

In the following, the invention is further explained with reference to the drawings showing embodiments.

In the drawing

FIG. 1 shows in a side elevation a sieve belt press comprising a device according to the invention for adjusting the belt tension, FIG. 2 shows a modified embodiment of the device for adjusting the tensioning force of FIG. 1 and FIG. 3 shows a further modification of the embodiment shown in FIG. 2.

Dewatering drums 2, 3, 4, 5 and 6 are arranged within a frame 1. The axes 7, 8, 9, 10 and 11 of these dewatering drums are bearingly supported within stationarily arranged bearing blocks 12, 13, 14, 15 and 16. Two sieve belts 17 and 18 are passed over these dewatering drums. The material to be dewatered is thrown onto the sieve belt 18 at the area 19 and moves into the tapering zone 21 between the sieve belts 17 and 18. The material to be dewatered is passed around the dewatering drums 2, 3, 4, 5 and 6 between the sieve belts 17 and 18 and this in form of a layer, the thickness of which is mainly dependent on the amount of material supplied and on the consistency of the material supplied. Downstream the dewatering drum 6, the belt 18 is passed over a deflection drum 22 and the belt 17 is passed over a deflection drum 23, at least the first-mentioned drum simultaneously forming the drive drum. 24 is the dumping location at which the dewatered sludge cake is dumped.

The sieve belts 17 and 18 are guided one independent from the other between the supply area 19 and the dumping location 24. The sieve belt 17 is guided around rolls 25 and 26 and around a tensioning roll 27. The sieve belt 18 is guided over rolls 28, 29, 30 and 31 and over a tensioning roll 32. The rolls 25 and 30 are belt travel correcting rolls.

Said both tensioning rolls 27 and 32 are, in the embodiment of FIG. 1, guided for being shifted on a common guide means 33, movement of said both tensioning rolls 27 and 32 one relative to the other being effected by a hydraulic or pneumatic cylinder-piston-aggregate 34 acting on the bearings 35 and 36.

In the embodiment according to FIG. 2, said both tensioning rolls 27 and 32 can be tensioned one relative to the other by means of two mutually opposed hydraulic cylinder-piston-aggregates 34. The working spaces of the cylinder-piston-aggregates 34 are designated 38.

In the embodiment according to FIG. 3, the tensioning rolls 27 and 32 are, preferably symmetrically, arranged on a two-arm lever 39 being pivotally supported at 40. When actuating the cylinder-piston-aggregate 41, the lever 39 is swivelled around the pivotal point 40 in the sense of the twin-arrow 41, which, with equal distance of the rolls 27 and 32 from the pivotal point 40 of the lever 39, results in an identical tensioning path for the belts 17 and 18.

In place of the cylinder-piston-aggregates 34 and, respectively, 41, also other drive means such as, for example, worm gears for electrical or manual actuation or the like can be used. When using pneumatic or hydraulic aggregates, the pressure existing within the just subjected working space of the cylinder-piston-aggregates can directly be used as a measure for the tensioning force. Similar considerations apply for a mechanical actuation via spring forces. In all other cases it is to recommend to arrange a pressure guage not shown within the force transmission path to the actuating member and to the bearings of the tensioning rolls. This arrangement provides the possibility to automatically maintain constant the tension of the belts via pressure stores, electric actuating motors or spring force.

What is claimed is:

1. Filter press for dewatering of materials, in which the material to be dewatered is passed between two water-permeable sieve belts or filter belts over dewatering drums and is subjected to pressure by the tension of the water-permeable belts, the material to be dewatered being supplied onto one of said water-permeable belts, the dewatered material being dumped at a location located downstream the dewatering drums as seen in travel direction and said water-permeable belts being separately guided between the dumping location and a supply area, characterized in that each of the sieve belts is separately passed over a respective tensioning roll which is adjustable in transverse direction to its axis by being supported in bearings which are mechanically coupled to each other and guided in the direction of adjusting movement, the adjusting movement of said tensioning rolls being effected by a lever arm mechanically connected at spaced-apart locations to said bearings and pivotally mounted at a location between said spaced-apart locations and a piston and cylinder unit acting on said lever arm.

2. Apparatus for dewatering material comprising: two endless water-permeable belts having travel paths which in part pass over dewatering drums so that material between the belts is subjected to dewatering pressure as the belts pass over the dewatering drums, each belt also separately passing over a respective tensioning roll which is supported in bearings adjustable in transverse direction to its axis; and means for adjusting positions of the tensioning rolls to control tension in the belts, said means comprising an actuator assembly including a two-armed lever mechanically connecting said bearings and pivotally supported between the axes of the tensioning rolls and a power driven actuator acting on one arm of the lever for applying a force to said axes.

3. Filter press for dewatering of materials, in which the material to be dewatered is passed between two water-permeable sieve belts or filter belts over dewatering drums and is subjected to pressure by the tension of the water-permeable belts, the material to be dewatered being supplied onto one of said water-permeable belts, the dewatered material being dumped at a location located downstream the dewatering drums as seen in travel direction and said water-permeable belts being separately guided between the dumping location and a supply area, characterized in that each of the sieve belts is separately passed over a respective tensioning roll which is adjustable in transverse direction to its axis by being supported in bearings which are guided in the direction of adjusting movement, the bearings of both tensioning rolls being connected one with the other via a two-armed lever which is pivotally supported between both axes of the tensioning rolls, the adjusting movement of said tensioning rolls being effected by at least one actuating member mechanically connected to one arm of the lever thereby acting on said one arm and on the axes of the tensioning rolls.

4. Filter press as claimed in claim 3, characterized in that the pivotal point of the lever is arranged for being shiftable within a guide means in parallel relation to the direction of the adjusting movement of the tensioning rolls.

5. Apparatus for dewatering material comprising: two endless water-permeable belts having travel paths which in part pass over dewatering drums so that material between the belts is subjected to dewatering pressure as the belts pass over the dewatering drums, each belt also separately passing over a respective tensioning roll which is adjustable in transverse direction to its axis; and means for adjusting positions of the tensioning rolls to control tension in the belts, said means comprising a power-driven actuator assembly common to both tensioning rolls and mechanically connected to the axes of both tensioning rolls for applying a force to said axes, said means further including a lever arm mechanically connected at spaced-apart locations to the axes of the tensioning rolls and pivotally mounted at a location between said spaced-apart locations and a linear drive unit acting on said lever arm.

6. Apparatus as in claim 5 wherein said drive unit is a hydraulic piston and cylinder unit.

* * * * *